United States Patent [19]

Young

[11] Patent Number: 4,815,676
[45] Date of Patent: Mar. 28, 1989

[54] FISHING REEL HANDLE WITH DRAG ADJUSTMENT INCORPORATED

[75] Inventor: John N. Young, Fairfax, Calif.

[73] Assignee: Charles C. Worth Corporation, Kentfield, Calif.

[21] Appl. No.: 150,915

[22] Filed: Feb. 1, 1988

Related U.S. Application Data

[63] Continuation-in-part of Ser. No. 912,114, Sep. 29, 1986.

[51] Int. Cl.⁴ .................. A01K 89/015; A01K 89/02
[52] U.S. Cl. .................... 242/219; 242/84.5 R
[58] Field of Search ............ 242/211, 216, 217, 218, 242/219, 220, 84.5 R, 84.5 A, 84.51 A, 84.1 J

[56] References Cited

U.S. PATENT DOCUMENTS

| 396,956 | 1/1889 | Prouty | 242/217 X |
|---|---|---|---|
| 804,047 | 11/1905 | Rockwell | 242/217 |
| 1,467,250 | 9/1923 | Readle | 242/216 |
| 1,730,331 | 10/1929 | Pflueger et al. | 242/217 |
| 2,136,438 | 11/1938 | Horsrud | 242/217 |
| 3,198,457 | 8/1965 | Holahan | 242/217 |
| 4,572,455 | 2/1986 | Noda | 242/217 X |
| 4,730,782 | 3/1988 | Young | 242/84.5 A |
| 4,732,348 | 3/1988 | Young | 242/217 |

FOREIGN PATENT DOCUMENTS 324595 1/1930 United Kingdom ............... 242/219

Primary Examiner—Joseph J. Hail, III
Attorney, Agent, or Firm—Melvin R. Stidham

[57] ABSTRACT

In a fishing reel, there is a main drive shaft rotatably on the reel body. A separable unit shaft may be selectively coupled to either end of the main drive shaft to drive it. The reel handle or crank is secured to a sleeve that is rotatable on the input shaft. Both the handle sleeve and the input shaft carry radial flanges between which are carried a drag disc and a friction washer. Pins on the drag disc engage through holes in the handle sleeve. A drag star pushes on the pins to squeeze the friction washer and adjust the torque that may be transmitted from the handle to the input shaft and, hence, the main drive shaft.

4 Claims, 2 Drawing Sheets

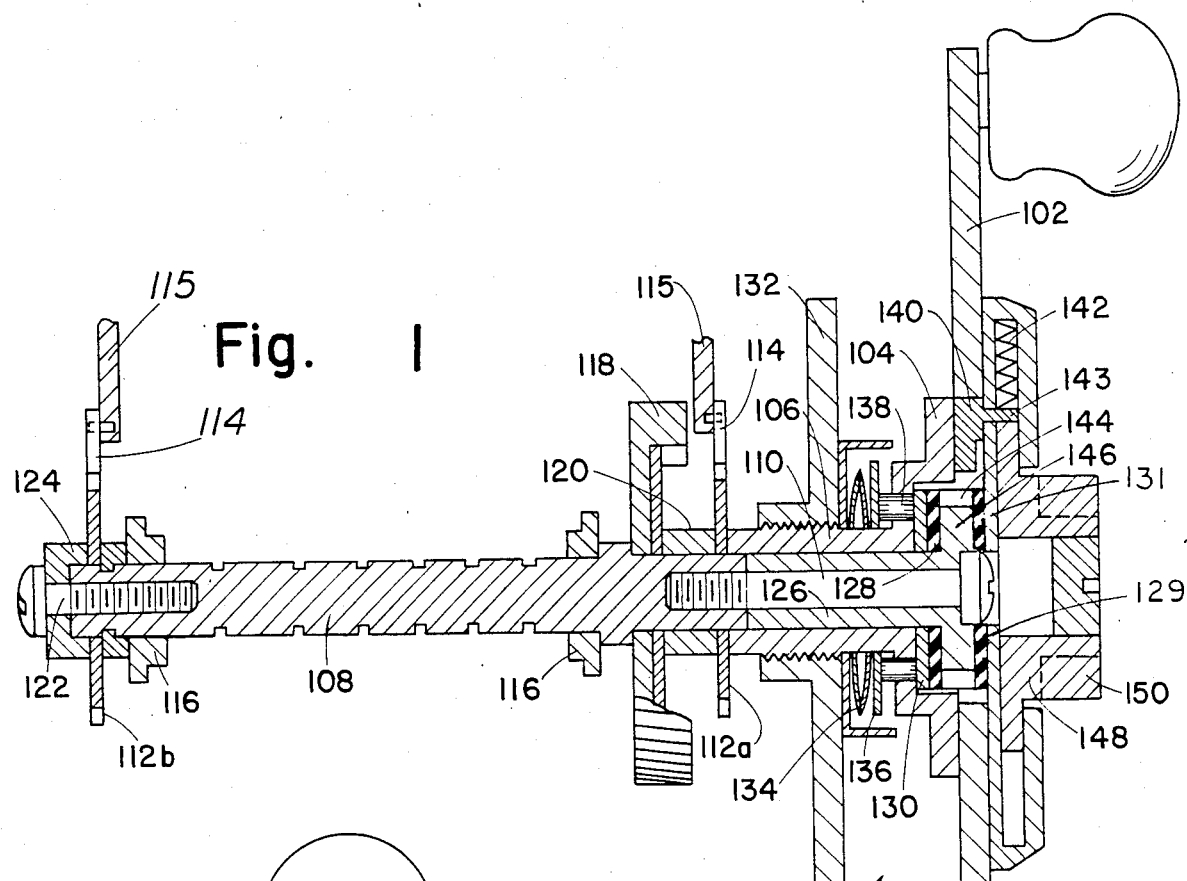
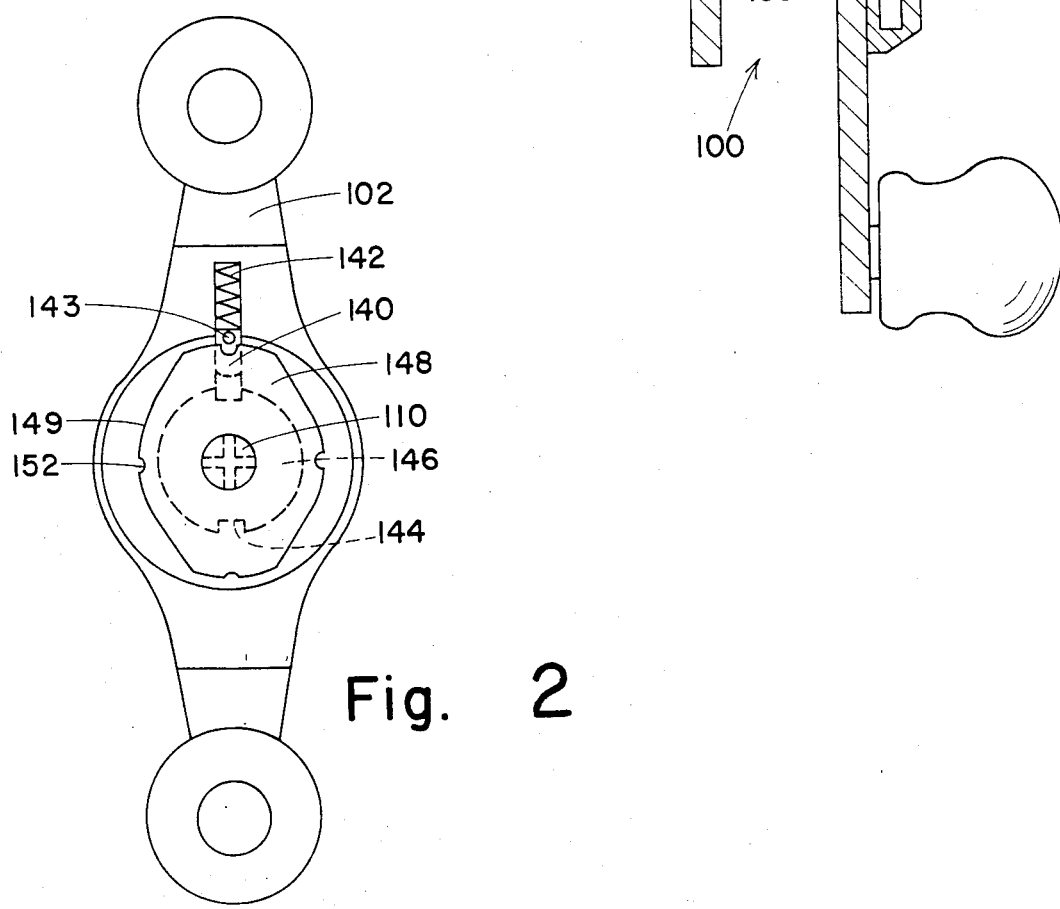

4,815,676

FISHING REEL HANDLE WITH DRAG ADJUSTMENT INCORPORATED

RELATED APPLICATION

This application is a continuation-in-part of my copending U.S. application Ser. No. 06/912,114 filed Sept. 29, 1986.

BACKGROUND OF THE INVENTION

Generally, the drag adjustment mechanism for a fishing reel is located inside the housing of the reel, often making it difficult to service it, or to replace components as required. In addition, the limited space within the reel housing places restrictions on the sizes to which some drag components can be made, thereby limiting the performance characteristics of the mechanism, including smoothness of operation and dissipation of heat of friction. In addition, with the drag adjustment mechanism located inside the reel housing, conversion of some reels from right-hand to left-hand operation is not feasible.

OBJECTS OF THE INVENTION

It is an object of this invention to provide a drag adjustment mechanism that is both situated and operated externally of the body of the reel.

It is a further object of this invention to provide a drag control mechanism that is closely associated with the reel operating handle.

It is a further object of this invention to provide a reel operating mechanism with associated drag control to facilitate conversion of the reel from right-hand to left-hand operation.

It is a further object of this invention to provide a drag control mechanism that can be easily serviced without disassembling the fishing reel.

Other objects and advantages of the invention will become apparent from the description to follow, particularly when read in conjunction with the accompanying drawings.

SUMMARY OF THE INVENTION

In carrying out this invention, a handle assembly with an input or operating shaft is selectively coupled to either end of the main drive shaft of a fishing reel. A sleeve, which is fixed to the handle or crank, is rotatably mounted on the input shaft. A drag disc is driven by the sleeve and a friction washer is interposed between the drag disc and a radial flange on the input shaft. A drag star is threaded on the sleeve to squeeze the friction washer to control the amount of torque that can be transmitted from the handle to the input shaft when the handle is rotated, or conversely, the amount of pull on the line that can be withstood before slipping.

BRIEF DESCRIPTION OF THE DRAWINGS

In the drawings:

FIG. 1 is a section view of an embodiment of this invention;

FIG. 2 is an end view of the embodiment of FIG. 1; and

DESCRIPTION OF PREFERRED EMBODIMENTS

Figure 3:
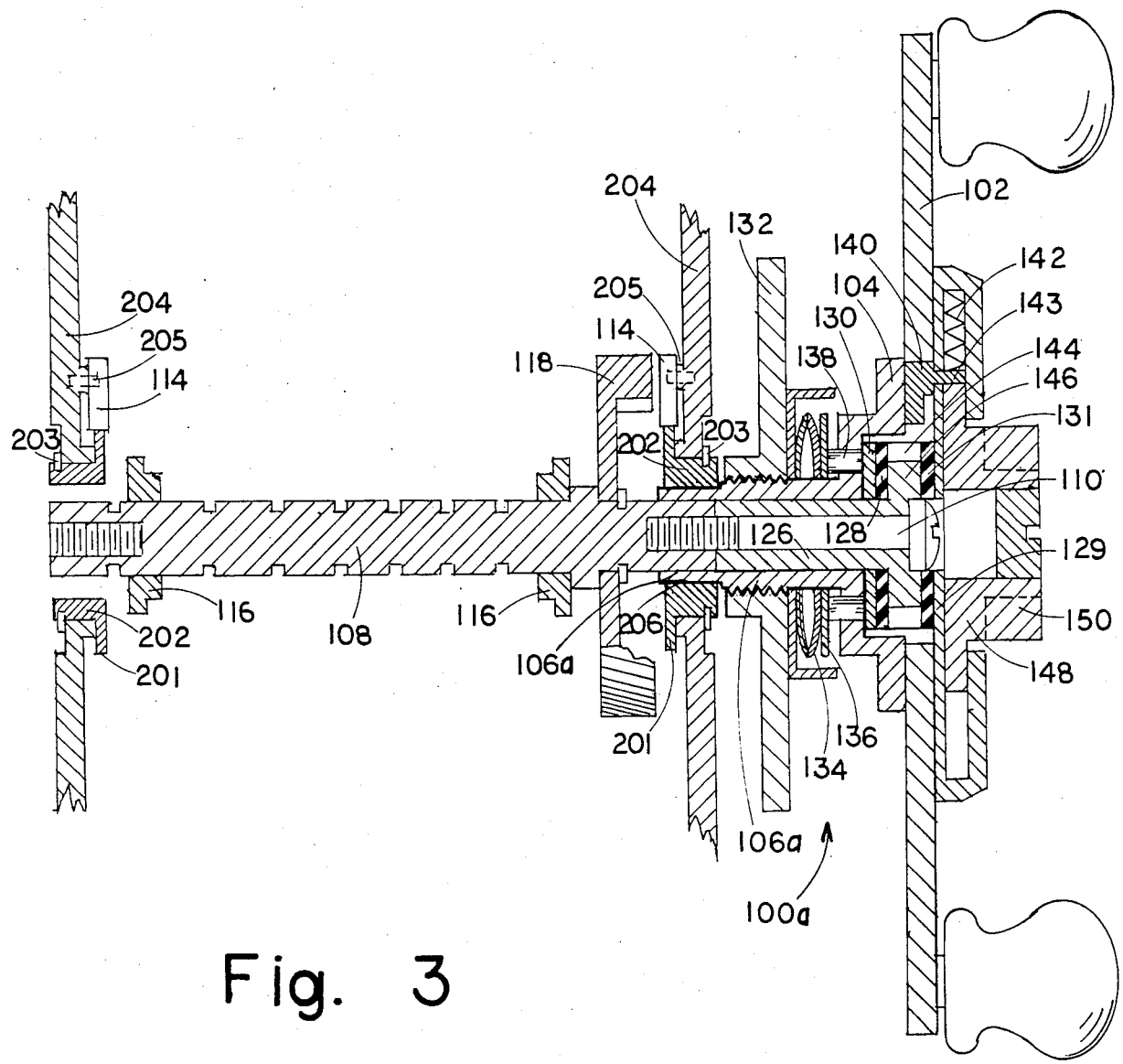
FIG. 3 is a section view of another embodiment of this invention.

The Embodiment of FIGS. 1 and 2

In this embodiment of the invention 100, a fishing reel crank or handle arm 102 has affixed thereto a radial flange 104, which is secured to, or integral with, a handle arm sleeve 106. The entire handle assembly 100, including crank arm 102 and sleeve 106, may be secured selectively by means of a screw 110, to either end of a fishing reel drive shaft 108, for either right hand or left hand drive. Suitable means on the end of the sleeve 106 cause it to interlock mechanically with an antireverse ratchet 112a or 112b on the end selected, so that the ratchet rotates with the handle 102. The ratchet 112a is engaged by a pawl 114, which is carried on the body 115, so that the handle 102 can be turned in one direction only.

The fishing reel drive shaft 108 is mounted in bearings 116 on the body 115 and carries a main gear 118 to rotate therewith. A collar 120 and the ratchet 112a are rotatably carried on one end of the drive shaft 108. Another ratchet 112b is carried on the other end of the shaft 108 and held in place by a screw 122 and retainer cap 124.

As is apparent, the screw 122 and cap 124 may be removed, and with the opposite screw 110 removed, the sleeve 106 and handle moved to the opposite or left end of the drive shaft 108 whereby the sleeve 106 will interlock mechanically with the ratchet 112b engaged by pawl 114. Hence, the ratchet 112a or 112b at the selected end of the drive shaft 108 is mechanically interlocked with the sleeve 106 and the drive shaft itself 108 is interlocked to rotate with an input or handle shaft 126.

The tubular input or handle shaft 126, which carries an integral radial flange 146, is coupled to the selected end of the drive shaft 108 by means of the screw 110. Rotation of the handle 102 is transmitted to the input shaft 126 by squeezing the radial flange 146 and friction drag washers 128 and 129 between a drag plate 130 and a drag washer 131 on the handle 102. A drag star 132 may be threaded onto the handle arm sleeve 106 to compress spring washers 134 and force a flat washer 136 against pins 138, which protrude axially from the drag plate 130. This increases compression of the friction drag washers 128 and 131 on opposite sides of the radial flange 146, and increases the drag or resistance of the friction drive between handle sleeve 106 and input shaft 126 to resist pull on the fishing line (not shown). Since the pins 138 engage through holes in the flange 104 of the handle arm sleeve 106, the drag plate 130 rotates with the handle arm 102. Hence, the friction drag washer 128 and 131 impart rotation of the handle sleeve 106 to the input shaft 126. The screw 110 couples the input shaft 126 to the drive shaft 108 to drive it directly.

A locking key 140 carried on the handle arm 102 is biased by a spring 142 toward engagement with a recess 144 (FIG. 6) in a flange 146 integral with the input shaft 126. A drag locking cam 148, which is turned manually by gripping a knob 150, normally holds the locking key 140 out of engagement with the recess 144 so that driving engagement between the handle 102 and the input shaft 126 is through the drag stack 130, 128 and 146, as previously described.

However, when the cam 148 is turned to a low profile 149 and the cam follower 143 on the locking key drops into a notch 152, the spring 142 is free to bias the locking key 140 into a recess 144 in the handle shaft flange 146, locking the handle 102 to the handle shaft 106 for positive drive, without drag.

The Embodiment of FIG. 3

In this embodiment, the anti-reverse ratchets 201 are carried on sleeves 202 that are rotatably carried in the reel side plates 204, wherein they are held against axial movement by split rings 203. The anti-reverse pawls 114 are pivoted on the side plates 204 on pins 205. The handle sleeve 106a has flat surfaces 206 or are otherwise keyed to receive complementary keyed openings in the ratchet sleeves 202 so that, when the assembly 100a is attached to an end of the drive shaft 108, by means of the screw 110, the keyed portion 206 of the handle sleeve 106a engages the selected anti-reverse ratchet 201 to drive it. Hence, when changing from right hand drive to left hand drive, there is no need to remove and replace the end cap 124 and screw 122 as in the embodiment of FIGS. 1 and 2.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invnetion is:

1. A fishing reel comprising:
   a reel body;
   a drive shaft rotatable on said reel body;
   an input shaft;
   means securing one end of said input shaft to an end of said drive shaft to drive said drive shaft therewith;
   a threaded handle sleeve slidable on said input shaft to rotate thereon;
   a reel handle secured to said handle sleeve;
   a first radial flange on said handle sleeve;
   a second radial flange on the other of said input shaft;
   a drag disc and a friction drag washer interposed between said first and second radial flanges;
   axially disposed pins secured to said drag disc and extending slidably through complementary holes in said first radial flange so that said drag disc rotates with said handle sleeve; and
   a drag star threaded on said handle sleeve to apply axial forces against said pins and squeeze said friction drag washer between said drag disc and said second radial flange.

2. The fishing reel defined by claim 1 including:
   anti-reverse ratchet means to prevent reverse rotation of said handle sleeve.

3. The fishing reel defined by claim 1 including:
   an anti-reverse ratchet rotatable on said reel body;
   a pawl on said body engaging said ratchet to prevent reverse rotation thereof; and
   complementary coupling means on said handle sleeve and said ratchet engaged when said input shaft is secured to one end of said drive shaft so that said ratchet rotates with said input shaft.

4. The fishing reel defined by claim 3 including:
   another anti-reverse ratchet rotatable on said reel body;
   another pawl on said body engaging said another ratchet to prevent reverse rotation thereof; and
   complementary coupling means on said handle sleeve and said another ratchet engaged when said input shaft is secured to the other end of said drive shaft so that said another ratchet rotates with said input shaft.

* * * * *